(12) United States Patent
Uriel (10) Patent No.: US 11,797,685 B2
(45) Date of Patent: Oct. 24, 2023

(54) SYSTEM AND METHOD FOR PERFORMING AUTOMATED SECURITY REVIEWS

(71) Applicant: Checkpoint Software Technologies Ltd., Tel Aviv (IL)

(72) Inventor: Ilan Uriel, Reut (IL)

(73) Assignee: Check Point Software Technologies LTD., Tel Aviv (IL)

( * ) Notice: Subject to any disclaimer, the term of this patent is extended or adjusted under 35 U.S.C. 154(b) by 375 days.

(21) Appl. No.: 17/024,787

(22) Filed: Sep. 18, 2020

(65) Prior Publication Data

US 2022/0092190 A1     Mar. 24, 2022

(51) Int. Cl.
*G06F 21/57*     (2013.01)
*G06F 21/62*     (2013.01)
*G06F 21/55*     (2013.01)

(52) U.S. Cl.
CPC .......... *G06F 21/577* (2013.01); *G06F 21/552* (2013.01); *G06F 21/6209* (2013.01); *G06F 21/6281* (2013.01); *G06F 2221/033* (2013.01)

(58) Field of Classification Search
CPC .. G06F 21/577; G06F 21/552; G06F 21/6209; G06F 21/6281; G06F 2221/033
See application file for complete search history.

(56) References Cited

U.S. PATENT DOCUMENTS

| 11,277,436 B1* | 3/2022 | Smith | H04L 63/1441 |
| 2015/0249684 A1* | 9/2015 | Zhang | G06Q 10/10 726/1 |
| 2016/0294800 A1* | 10/2016 | Oppenheim, Jr. | G06F 16/2455 |
| 2019/0095253 A1* | 3/2019 | Curtis | H04L 67/34 |
| 2022/0038368 A1* | 2/2022 | Shen | H04L 45/02 |

OTHER PUBLICATIONS

Md. Shazibul Islam Shamim • Farzana Ahamed Bhuiyan • Akond Rahman; XI Commandments of Kubernetes Security: A Systematization of Knowledge Related to Kubernetes Security Practices; 2020 IEEE Secure Development (SecDev) (pp. 58-64); (Year: 2020).*
Zhenwu Shi • Chenming Jiang • Landu Jiang • Xue Liu; HPKS: High Performance Kubernetes Scheduling for Dynamic Blockchain Workloads in Cloud Computing; 2021 IEEE 14th International Conference on Cloud Computing (CLOUD) (pp. 456-466); (Year : 2021).*
Hamed Hamzeh • Sofia Meacham • Kashaf Khan; A New Approach to Calculate Resource Limits with Fairness in Kubernetes; 2019 First International Conference on Digital Data Processing (DDP) (pp. 51-58); (Year: 2019).*
Nilton Bila, Paolo Dettori, Ali Kanso, Yuji Watanabe, Alaa Youssef; Leveraging the Serverless Architecture for Securing Linux Containers; 2017 IEEE 37th International Conference on Distributed Computing Systems Workshops; (Year: 2017).*

\* cited by examiner

*Primary Examiner* — Luu T Pham
*Assistant Examiner* — Chao Wang
(74) *Attorney, Agent, or Firm* — Renner, Otto, Boisselle & Sklar, LLP (57) ABSTRACT

An automated method executed by circuitry is provided for monitoring a software platform including multiple pods that manage, deploy, and execute micro services. The method uses monitoring pods at locations of interest in the software platform to label transactions that pass through the monitoring pods. The labels applied to the transactions are sent to a security program for review.

16 Claims, 4 Drawing Sheets

SYSTEM AND METHOD FOR PERFORMING AUTOMATED SECURITY REVIEWS

TECHNICAL FIELD

The present disclosure relates generally to a software platform and more particularly to securing a software platform implementing micro-services.

BACKGROUND

Current software platforms frequently use containers. Containers are an example of an approach for implementing operating-system-level virtualization. They are self-contained execution environments that can have their own isolated CPU, memory, input/output (I/O), and network resources, and may share a kernel of a host operating system. Containers can be isolated from one other (physical and/or virtual servers). Containers can be easier to build and configure than virtual machines, and because containers can be decoupled from their underlying infrastructure and from host file systems, they can be highly portable across various clouds and operating system distributions. Enterprises can rapidly develop software for distributed applications, services, and microservices in private networks, public clouds, or both (e.g., hybrid clouds or multi-clouds) by running them in containers in development and test environments.

When developing a software product, there is typically a security review of the product that is performed manually. In the security review, the developers of the new software typically meet in front of a committee and describe the architecture of the software. After discussing the architecture, there is a verbal discussion with the panel to identify security risk that needs to be covered.

The above described security review is a manual process and, for this reason, will fail to identify every issue. Additionally, the security review is a static process that only addresses the software before launch. After launch, later versions of the software typically do not receive the same manual security review attention due to the speed at which new versions are released as discussed above. Consequently, a security review performed weeks or months previously may no longer be valid due to security holes caused by the addition of new features to the software.

SUMMARY

In a software platform including containers, different containers have predefined rolls. Knowledge of the predefined components with predefined rolls allows a greater understanding of the processes being performed by the software platform. It is possible to interrogate a controller of the software platform to determine the nature of flow due to these predefined rolls. The flow of information in the software program can then be compared to predefined security policies. For example, the predefined security policies may vary between developers running the software platform and may also vary depending on location in the software platform. As an example, the security policies may vary for database transactions depending on whether the database transactions are related to accounting or a frequently asked questions (FAQ) inside an organization network that is not exposed to external transactions. With database transactions related to accounting, the security policies may specify that SQL injection protection is mandatory, while similar database transactions related to the FAQ may not require SQL injection protection.

Instead of using manual reviews or brute force attacks that simply measure security at an instance in time, the present disclosure provides an automated method for monitoring a software platform that deploys micro services. A security review may be performed by comparing the output of the monitoring to predefined rules.

According to one aspect of the disclosure, there is provided a method executed by circuitry for monitoring a software platform including multiple pods that manage, deploy, and execute micro services. The method includes identifying using the circuitry at least one pod of interest of the software platform and generating at least one monitoring pod. For each of the at least one pod of interest, the method positions one of the at least one monitoring pod in association with the pod of interest using the circuitry, such that: transactions received by the pod of interest are first received by the monitoring pod; and/or transactions sent by the pod of interest to a peer pod are first received by the monitoring pod before reaching the peer pod. The method also identifies using the circuitry at least one sending pod from the at least one monitoring pod. The sending pod is configured to communicate with a security program executed by a processor. For each transaction received by a monitoring pod: the method determines if the received transaction includes a unique identifier and, when the received transaction does not include a unique identifier, the method adds a unique identifier to identifying information attached to the received transaction. The method also adds a defined characteristic for the monitoring pod to the identifying information of the transaction. When the monitoring pod is one of the at least one sending pods, the method sends the identifying information of the transaction to the security program.

Alternatively or additionally, the method also includes performing a security review of the identifying information received by the security program. The security review includes identifying any matched rules from a set of predefined rules that are satisfied by the defined characteristics included in the received identifying information. The method also generates and outputs a security report based on the identified matched rules.

Alternatively or additionally, the predefined rules include at least one sequential rule, the at least one sequential rule includes an ordered sequence of defined characteristics, and the received identifying information matches the at least one sequential rule when the received identifying information includes the defined characteristics of the at least one sequential rule in a same order as the at least one sequential rule.

Alternatively or additionally, the generating of the report includes adding to the report remedial security measures associated with the matched rules.

Alternatively or additionally, the method further includes identifying an unsecure monitoring pod based on the security report and either: passing instructions to the unsecure monitoring pod to secure the software platform, such that the unsecure monitoring pod no longer passes along transactions received by the unsecure monitoring pod; or injecting an attack configured to be detected by a security mechanism of the software platform, such that the security mechanism limits the transactions received by the pod associated with the unsecure monitoring pod.

Alternatively or additionally, the at least one sending pod is identified based on properties of the identifying information of the transaction.

Alternatively or additionally, a receiving pod that receives the transaction self identifies as one of the at least one sending pods when at least one of: a size of the identifying information of the received transaction surpasses a size threshold; or the identifying information of the received transaction includes a predetermined defined characteristic.

Alternatively or additionally, the at least one sending pod is identified based on a position of the at least one sending pod within the software platform.

Alternatively or additionally, a receiving pod that receives the transaction self identifies as one of the at least one sending pods when the received transaction will not be sent to any additional pods in the software platform after the received transaction is processed by the receiving pod.

Alternatively or additionally, the transaction is a network packet and the identifying information is stored in a header of the network packet.

Alternatively or additionally, the identifying information is predefined codes associated with characteristics of the transaction.

Alternatively or additionally, the characteristics include at least one of: source address and port, destination address and port, source protocol, destination protocol, source micro service application, destination micro service application, source micro service type, destination micro service type, source data classification, destination data classification, order and time interval of flow in various sidecars in the software platform, or credentials used to process and execute the transaction by the micro service.

According to another aspect of the disclosure, there is provided an electronic device for monitoring a software platform including multiple pods that manage, deploy, and execute micro services. The electronic device includes circuitry that identifies at least one pod of interest of the software platform, generate at least one monitoring pod, and identifies at least one sending pod from the at least one monitoring pod. For each of the at least one pod of interest, the circuitry positions one of the at least one monitoring pod in association with the pod of interest using the circuitry, such that transactions received by the pod of interest are first received by the monitoring pod and/or transactions sent by the pod of interest to a peer pod are first received by the monitoring pod before reaching the peer pod. For each transaction received by a monitoring pod, the circuitry determines with the monitoring pod if the received transaction includes a unique identifier; when the received transaction does not include a unique identifier, adds a unique identifier with the monitoring pod to identifying information attached to the received transaction; and adds with the monitoring pod a defined characteristic for the monitoring pod to the identifying information of the transaction. When the monitoring pod is one of the at least one sending pods, the circuitry sends with the monitoring pod the identifying information of the transaction to a security program.

Alternatively or additionally, the electronic device includes a non-transitory computer readable memory storing a set of predefined rules. The circuitry is further configured to: execute the security program; perform a security review of the identifying information received by the security program, the security review including identifying any matched rules from the set of predefined rules that are satisfied by the defined characteristics included in the received identifying information; and generate and output a security report based on the identified matched rules.

Alternatively or additionally, the predefined rules include at least one sequential rule. The at least one sequential rule includes an ordered sequence of defined characteristics. The received identifying information matches the at least one sequential rule when the received identifying information includes the defined characteristics of the at least one sequential rule in a same order as the at least one sequential rule.

Alternatively or additionally, the generating of the report includes adding to the report remedial security measures associated with the matched rules.

Alternatively or additionally, the circuitry is further configured to: identify an unsecure monitoring pod based on the security report; and pass instructions to the unsecure monitoring pod to secure the software platform, such that the unsecure monitoring pod no longer passes along transactions received by the unsecure monitoring pod.

Alternatively or additionally, the circuitry is further configured to identify the at least one sending pod based on a position of the at least one sending pod within the software platform.

Alternatively or additionally, the identifying information is predefined codes associated with characteristics of the transaction.

Alternatively or additionally, the characteristics include at least one of: source address and port, destination address and port, source protocol, destination protocol, source micro service application, destination micro service application, source micro service type, destination micro service type, source data classification, destination data classification, order and time interval of flow in various sidecars in the software platform, or credentials used to process and execute the transaction by the micro service.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

The present invention is described below in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

According to a general embodiment, an automated method executed by circuitry is provided for monitoring a software platform including multiple pods that manage, deploy, and execute micro services. The method uses monitoring pods at locations of interest in the software platform to label transactions that pass through the monitoring pods. The labels applied to the transactions are sent to a security program for review.

As described above, containers play an increasingly important role in a modern network. Containers can be used to modernize a data center by packaging existing applications into containers to improve utilization of computing resources and to reduce costs. Due to their portability, containers can also simplify different cloud migration strategies, such as hybrid cloud or multi-cloud architectures. Containers can also promote modern development strategies, such as continuous integration, delivery, and deployment (CI/CD), because of their isolated nature and robustness to rapidly changing environments. In addition, containers are lightweight by design and ideal for enabling services and microservices, whether building new services and microservices, or refactoring monolithic applications into smaller services or microservices.

A pod is the unit of work in a software platform including containers. Pods can help to manage groups of closely related containers that may depend on each other and that may need to cooperate on the same host to accomplish their tasks. Each pod can include one or more containers. Pods can be scheduled together and run on the same machine. The containers in each pod can have the same IP address and port space; they can communicate using localhost or standard inter-process communication. In addition, the containers in each pod can have access to shared local storage on the host (e.g., node, server, etc.) of the pod. The shared storage can be mounted on each container.

The microservices provided by the pods 18 are used to break larger software products down into small pieces where each piece is responsible for different actions. The combination of the microservices provided by the pods 18 is similar to the services previously provided by larger monolithic applications. For example, a service like Netflix uses one microservice for recommending content based on user taste, another microservice for handling subscriptions, and another microservice for routing selected content to a streamer.

Pods 18 allow for transactions to be more easily traced and quantified than is possible with packet sniffing. Because you are only seeing a tiny section of an ongoing communication when sniffing packets, it is often difficult or impossible to get a larger understanding of what is happening. But, when using pods 18 that provide microservices, there are services that are responsible for registering applications (e.g., the API gateway) that can be interrogated to determine, e.g., whether the software platform includes a database or where a received transactions is going to next.

Figure 1:
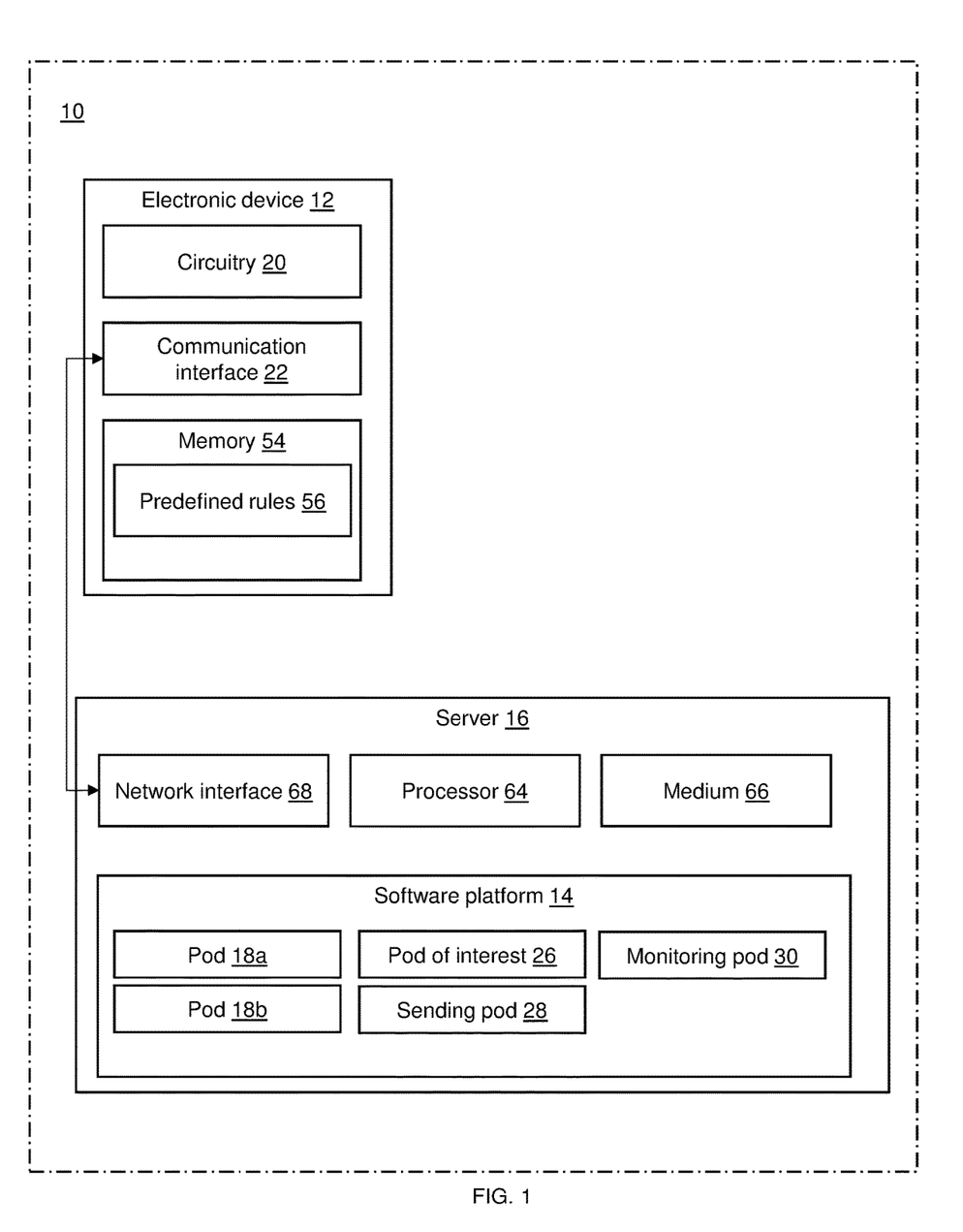
FIG. 1 is a schematic diagram of a general embodiment of a system including a server and an electronic device.

Turning to FIG. 1, a system 10 is shown including an electronic device 12 for monitoring a software platform 14 hosted by the server 16. The software platform 14 includes multiple pods 18 that manage, deploy, and execute micro services. The electronic device 12 includes circuitry 20, and a communication interface 22 that electronically communicates with the software platform 14. The circuitry 20 identifies at least one pod of interest 26 of the software platform 14 and generates at least one monitoring pod 30. The circuitry 20 also identifies at least one sending pod 28 from the monitoring pod(s) 30. For each pod of interest 26, the circuitry 20 positions a monitoring pod 30 in association with the pod of interest 26, such that transactions 32 received and/or sent by the pod of interest 26 are first received by the monitoring pod 30. For example, the monitoring pod 30 may be positioned, such that transactions 32 sent by the pod of interest 26 to a peer pod 34 are first received by the monitoring pod 30 before the transactions 32 reach the peer pod 34.

The platform 14 may manage, deploy, execute, and scale micro services. For example, the platform 14 may run on a framework such as Kubernetes, Docker, or Container. In this example, the monitoring pod 30 may be referred to as a sidecar.

Figure 2:
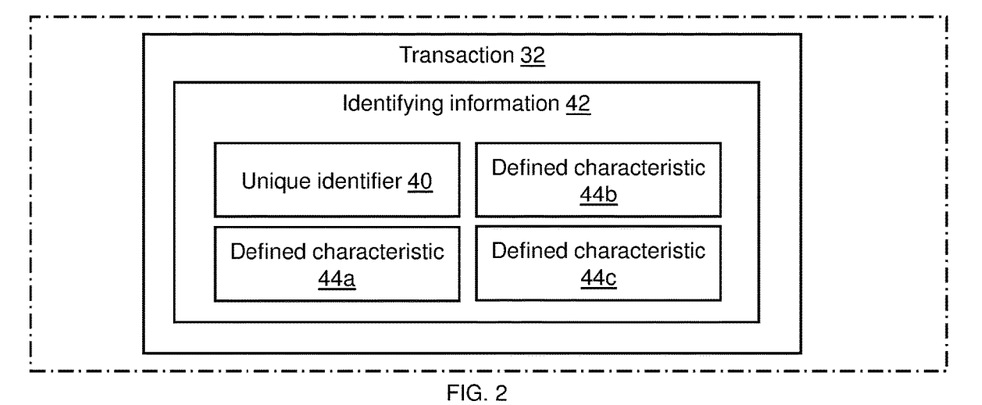
FIG. 2 is a schematic diagram of a general embodiment of a transaction.

Turning to FIG. 2, for each transaction 32 received by a monitoring pod 30, the monitoring pod 30 determines if the received transaction 32 includes a unique identifier 40. When the received transaction 32 does not include a unique identifier 40, the monitoring pod 30 adds a unique identifier 40 to identifying information 42 attached to the received transaction 32. For example, the transaction 32 may be a network packet and the identifying information 44 may be stored in a header of the network packet. The unique identifier 40 may be a numeric or alphanumeric string. The monitoring pod 30 may request the unique identifier 40 from the platform 14 or generate the unique identifier as a random string.

After ensuring that the received transaction 32 includes a unique identifier 40, the monitoring pod 30 adds a defined characteristic 44 for the monitoring pod 30 to the identifying information 42 of the transaction 32. The defined characteristics 44 may be predefined characteristic identifiers that describe environmental and transactional metadata. As shown in the exemplary embodiment of FIG. 2, the defined characteristics 44 may be predefined codes associated with characteristics of the transaction. That is, the defined characteristic 44 for each monitoring pod 30 may be a predefined code specifying a certain characteristic of the transaction. The characteristics of the transaction 32 may include at least one of: source address and port, destination address and port, source protocol, destination protocol, source micro service application, destination micro service application, source micro service type, destination micro service type, source data classification, destination data classification, order and time interval of flow in various sidecars in the software platform, or credentials used to process and execute the transaction by the micro service.

As an example, when a transaction includes data received from a website (e.g., facebook.com), the characteristic represented by the defined characteristic 44 added to the identifying information 42 may be that the transaction originated from an external entity (i.e., not a computer or device located within an internal network). The defined characteristic 44 may also indicate a trust level associated with the transaction 32. For example, transactions 32 initiated from computers within a private network may have a highest level of trust, transactions from a white list of external websites may have a medium level of trust, and transactions from all other websites and computers may have a low trust level.

Figure 3:
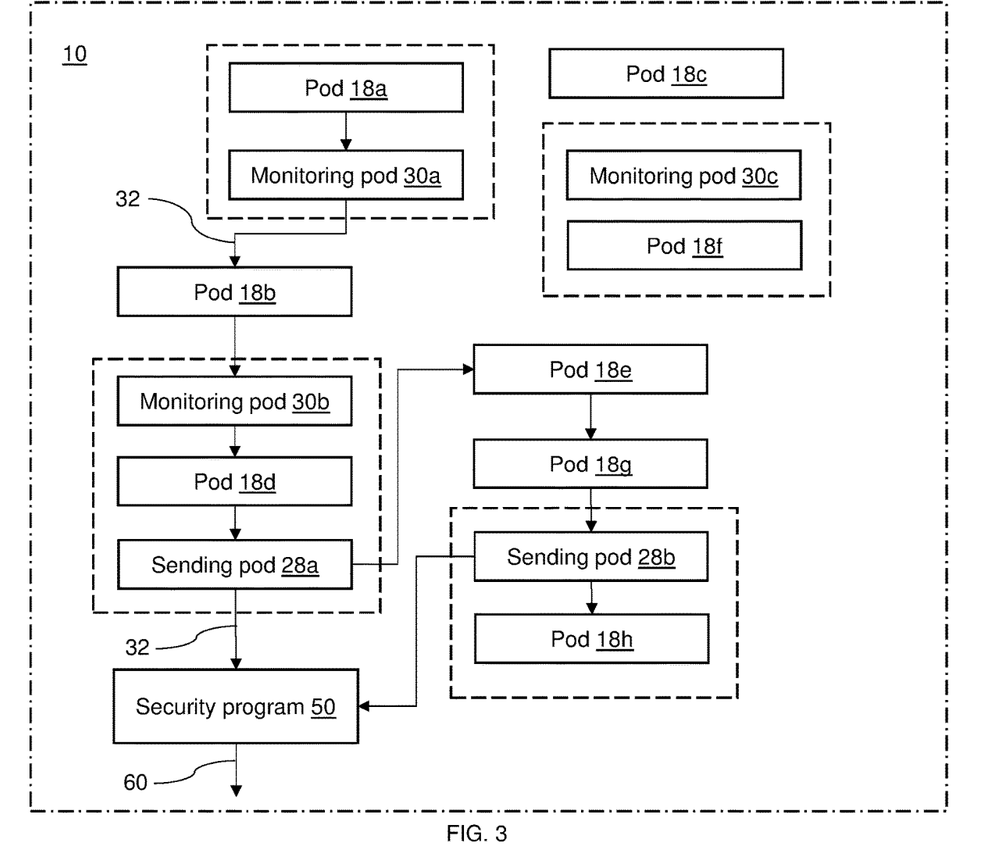
FIG. 3 is a schematic diagram of an exemplary flow of transactions through a software platform.

Turning to the example in FIG. 3, pod 18a may be associated with communications received via the internet. Monitoring pod 30a (which is associated with pod 18a) may add a defined characteristic 44 (i.e., a predefined code) to identifying transactions being sent by pod 18*a* as originating from the internet. Similarly, pod 18*d* may be associated with entering data into a database. Monitoring pod 30*b* (which is associated with pod 18*d*) may add a predefined code (i.e., a defined characteristic 44) associated with a database to the identifying information 42 for transactions sent to pod 18*d*.

When the monitoring pod 30 is one of the sending pod(s) 28, the monitoring pod 30 sends the identifying information 42 of the transaction 32 to a security program 50. The security program 50 may be executed by the circuitry 20 of the electronic device 12 or circuitry of some other device (e.g., another server).

Continuing the above example, transactions 32 exiting pod 18*d* (associated with a database) may have a defined characteristic 44 added by sending pod 28*a* to the identifying information 42 specifying that the transaction is associated with a database and also specifying a time that the transaction 42 was received from pod 18*d*. The sending pod 28*a* transmits the identifying information 42 for the transaction 32 to the security program 50. By comparing the defined characteristic 44 added by monitoring pod 30*b* (before entering the database) and sending pod 28*a* (after entering the database) a length of time that the microservice performed by pod 18*d* (i.e., entering data into the database) may be determined by the security program 50. The security program 50 may use this information to identify potential security issues. For example, if typical transactions take less than 300 milliseconds (ms) to be completed by pod 18*d* and a new transaction takes over 40 seconds (i.e., 40,000 ms), then the security program 50 may determine that this new transaction was abnormal and may have been malicious.

With continued reference to FIG. 3, more than one sending pod 28 may send data to the security program 50. For example, pod 18*h* may be associated with credit card processing. Sending pod 28*b* (which is also a monitoring pod 30) may add a predefined code (i.e., a defined characteristic 44) to the identifying information 42 for transactions 32 sent to pod 18*h*. As a sending pod 28*b*, sending pod 28*b* may additionally send the identifying information 42 for the transaction to the security program 50.

Sending pod(s) 28 may be identified based on properties of the identifying information 42 of the transaction 32. For example, a receiving pod (i.e., a monitoring pod 30) that receives the transaction 32 may self-identify as a sending pod 28 when at least one of: a size of the identifying information 42 of the received transaction 32 surpasses a size threshold or the identifying information 42 of the received transaction 32 includes a predetermined defined characteristic. As an example, a monitoring pod 30 may analyze identifying information 42 of a received transaction 32 for a particular defined characteristic 44. If the identifying information 42 includes the particular defined characteristic 44 (e.g., credit card processing), then the monitoring pod 30 may identify as a sending pod 28 and send the identifying information 42 to the security program 50.

In a general embodiment, the circuitry 20 may identify the sending pod(s) 28 based on a position of the sending pod 28 within the software platform. For example, if a monitoring pod 30 is a last monitoring pod 30 that will receive the transaction 32 (i.e., there are no further monitoring pod 30 in the platform 14 that will receive the transaction 32), then the monitoring pod 30 may be identified as a sending pod 28 and send the identifying information 42 to the security program 50. As another example, a receiving pod (i.e., a monitoring pod 30) that receives the transaction 32 may self-identify as a sending pod 28 when the received transaction 32 will not be sent to any additional pods 32 in the software platform 14 after the received transaction 32 is processed by the receiving pod.

The electronic device 12 (also referred to as the central control unit) may also include a non-transitory computer readable memory ("memory") 54 storing a set of predefined rules 56. The circuitry 20 may perform a security review of the identifying information 42 received by the security program 50 as well as generate and output a security report 60 based on the identified matched rules. The security review may include identifying any matched rules from the set of predefined rules 56 that are satisfied by the defined characteristics 44 of the received identifying information 44.

As described, the security review may be performed by the electronic device 12. Alternatively, the security review may instead be performed by a different computer device (e.g., the server 16 running the software platform 14 or another server).

For example, one of the predefined rules 56 may specify three particular defined characteristics 44. If the received identifying information 42 includes these three defined characteristics (e.g., in any order) then the received identifying information 42 may satisfy this predefined rule 56.

The predefined rules 56 may also specify an ordered arrangement of defined characteristics 44. For example, the predefined rules 56 may include at least one sequential rule. The sequential rule includes an ordered sequence of defined characteristics. As an example, the sequential rule may specify the following defined characteristics in this order: internet communication, no SQL injection protection, and SQL database. The received identifying information 42 matches the sequential rule when the received identifying information 42 includes the defined characteristics 44 of the sequential rule in a same order as the sequential rule. In the above example, the following identifying information 42 matches the sequential rule: internet communication, document preparation, SQL database, SQL injection protection, credit card processing. The identifying information 42 matches the sequential rules, because the rule includes internet communication without SQL injection protection before interacting with a SQL database. In the above example, the identifying information 42 "internal communication, SQL database, internet communication" would not match the rule, because internet communication comes after interaction with the SQL database.

As described above, a security report 60 is generated following the security review. Generating the report 60 may include adding remedial security measures to the report that are associated with the matched rules. For example, in the above sequential rule example (i.e., internet communication, no SQL injection protection, and SQL database), the remedial security measure may be to add SQL injection protection prior to the SQL database. In another embodiment, the security report 60 may include a score categorizing the severity of any security violations detected within the platform 14.

In an embodiment, the platform 14 is updated based on the security report 60 to include the remedial security measures identified in the report. For example, the remedial security measures may be specific security products that are implemented on the server 16 automatically. In the above example, the platform 14 may be updated to include SQL sanitization (i.e., SQL injection protection) of the internet communication before the internet communication reaches a database.

In one embodiment, the circuitry 20 is further configured to identify an unsecure monitoring pod based on the security report 60. For example, in FIG. 3 the security report 60 may identify monitoring pod 30b as the unsecure monitoring pod. In this example, monitoring pod 30b may be identified as unsecure, because it is associated with a SQL database that receives transactions originating from the internet and that are not passed through SQL injection protection.

The circuitry 20 may pass instructions to the unsecure monitoring pod to secure the software platform 14 by performing a predefined action. For example, the unsecure monitoring pod may secure the software platform 14, such that the unsecure monitoring pod no longer passes along transactions 32 received by the unsecure monitoring pod. Continuing the above example, monitoring pod 30b may receive the instructions 32 to secure the platform 14 and the monitoring pod 30b may no longer pass along instructions 32 to pod 18d. In this way, because monitoring pod 30b has cut off communication to pod 18d, the platform 14 is protected from any malicious attacks directed at pod 18d (i.e., the database).

In another embodiment, the circuitry 20 may inject an attack into the software platform 14 that is configured to be blocked or intercepted by a security mechanism already present in the platform 14. The attack may also be configured not to cause actual harm to the software platform 14 if the security mechanism fails to block or intercept the attack. For example, the attack may be a SQL injection attack designed to delete a table that has been included in the system solely to be used as a target of such an attack. If the attack is blocked or intercepted, the security mechanism may block further transactions sent to the pod that is associated with the unsecured monitoring pod. In this way, the injected attack may be used to secure the system by securing a vulnerable pod through alerting a security mechanism by injecting an attack configured to be detected and blocked by the security mechanism. The security mechanism may be any software and/or hardware configured to improve security of the software platform 14 by affecting the flow of transactions within the software platform 14.

Figure 4:
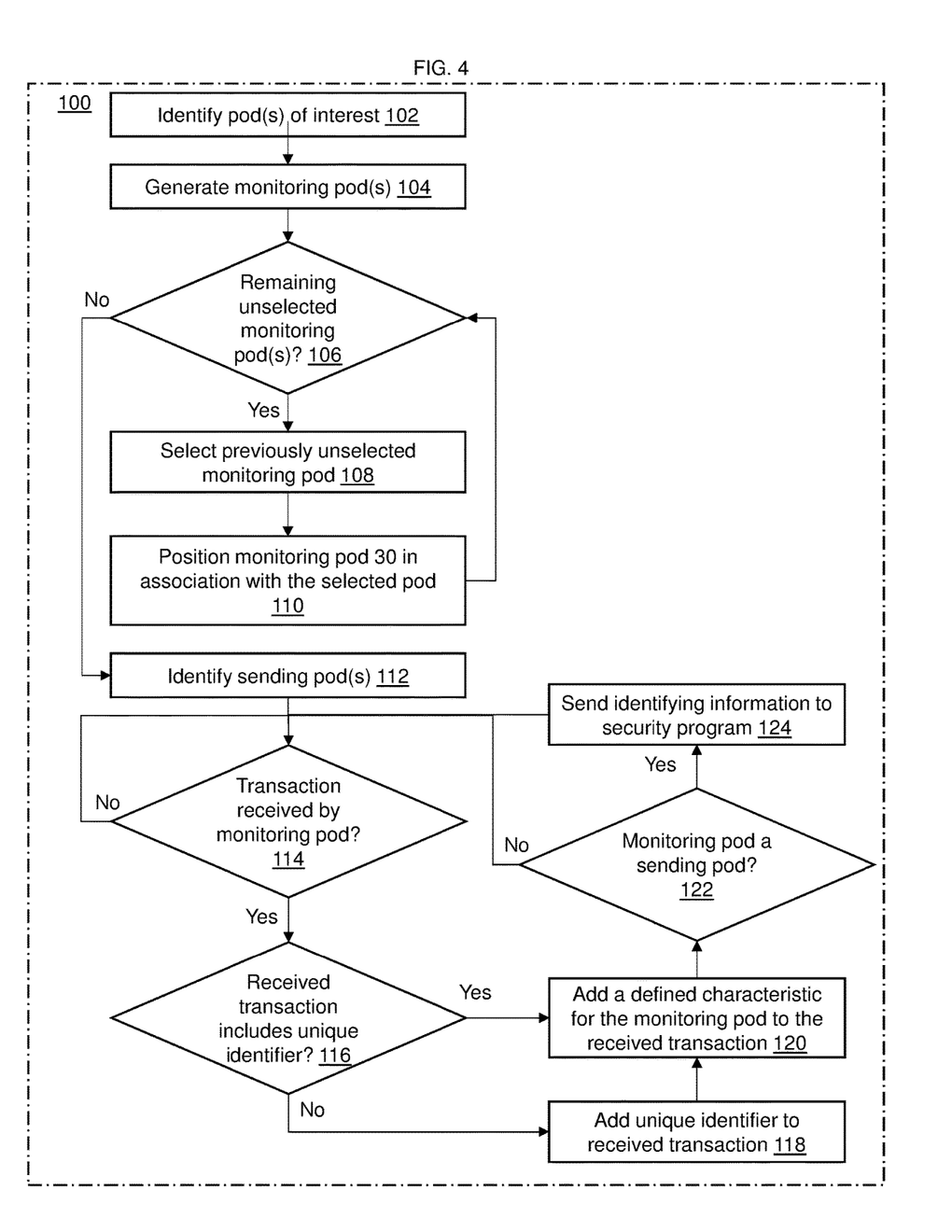
FIG. 4 is a flow diagram depicting an embodiment of a method for monitoring a software platform.

Turning to FIG. 4, a method 100 executed by circuitry 20 is shown for monitoring a software platform 14 including multiple pods 18 that manage, deploy, and execute micro services. In process block 102, the circuitry identifies pod(s) of interest. To identify the pod(s) of interest, the circuitry 20 may analyze the architecture of the software platform 14 (e.g., the pods 18 included in the platform 14 and the flow of transactions 32 between the pods 18). In process block 104, monitoring pod(s) 30 are generated. In decision block 106, a check is performed to see if any monitoring pods 30 have not yet been selected. If there remain unselected monitoring pods 30, then processing proceeds to process block 108. In process block 108, a previously unselected monitoring pod is selected.

In process block 110, a monitoring pod 30 is positioned in association with the selected pod (i.e., pod of interest) using the circuitry, such that transactions received by the pod of interest are first received by the monitoring pod 30 and/or transactions 32 sent by the pod of interest to a peer pod are first received by the monitoring pod 30 before reaching the peer pod.

Following process block 110, processing returns to decision block 106. If there are no remaining unselected monitoring pods in decision block 106, then processing continues to process block 112. In process block 112, a sending pod 28 is identified from the monitoring pod(s) 30. As described above, the sending pod 28 is configured to communicate with a security program 50 executed by a processor 64.

In decision block 114, a check is performed to determine if a transaction 32 has been received by a monitoring pod 30. If a transaction 32 has been received, then processing moves to decision block 116. In decision block 116, a check is performed to determine if the received transaction 32 includes a unique identifier 40. If the received transaction 32 does not include a unique identifier 40, then the method continues to process block 118. In process block 118, a unique identifier 40 is added to identifying information 42 attached to the received transaction 32. Following process block 118 or if the received transaction 32 was found to include a unique identifier 40 in decision block 116, then the method moves to process block 120. In process block 120, a defined characteristic 44 for the monitoring pod 30 is added to the identifying information 42 of the transaction 32.

In decision block 122, a check is performed to determine if the monitoring pod 30 is one of the sending pod(s). If yes, then processing continues to process block 124. If not, then processing returns to decision block 114. In process block 124, the identifying information 42 of the transaction 32 is sent to the security program 50.

Figure 5:
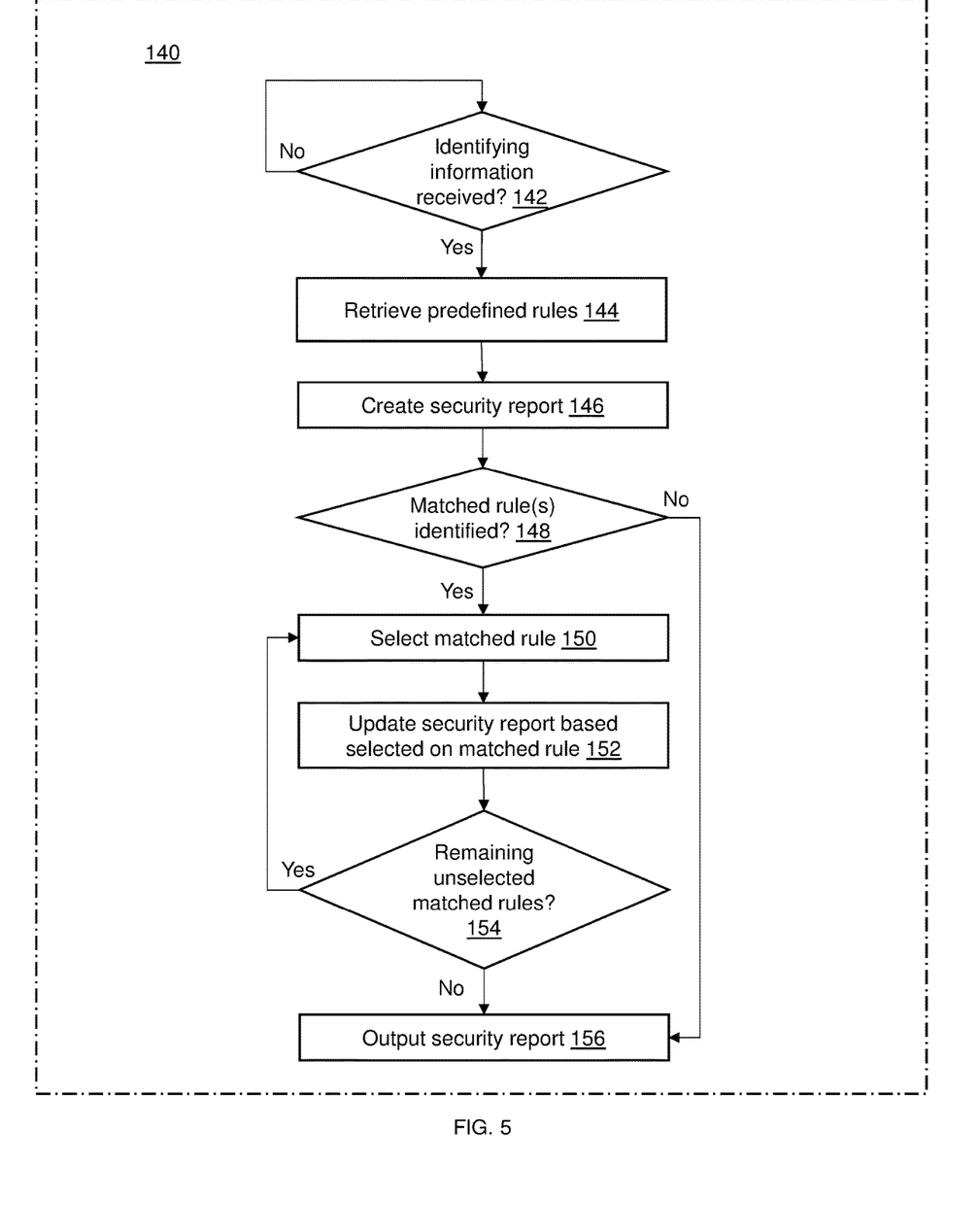
FIG. 5 is a flow diagram depicting an embodiment of a method for performing a security review of a software platform.

Turning to FIG. 5, a method 140 is shown for performing a security review of the identifying information received by the security program 50. The security program 50 may be a program executed by the circuitry 20 of the electronic device 12, the processor 64 of the server 64, or a separate computer device. In decision block 142, a check is performed to determine if identifying information 42 has been received by the program 50. If identifying information has been received, then processing moves to process block 144. In process block 144, a set of predefined rules 56 is retrieved. The predefined rules may be stored in any suitable memory location (e.g., the memory 54 of the electronic device 12 or the non-transitory computer readable medium 66 ("medium" of the server 16).

Following process block 144, processing continues to decision block 146. In process block 146, the security report 60 is created. In decision block 148 a check is performed to identify whether any rules from the set of predefined rules are satisfied by the defined characteristics included in the received identifying information 42. If there are matched rules, then processing continues to process block 150. In process block 150, a previously unselected matched rule is selected. In process block 152, the security report 60 is updated based on the selected matched rule.

In decision block 154, a check is performed to determine whether there are any remaining unselected matched rules. If yes, then processing returns to process block 150. If not, then processing continues to process block 156. In process block 156, the security report 60 is output.

While the circuitry 20 and the software platform 14 are depicted in FIG. 1 as being executed by separate hardware (i.e., the electronic device 12 and the server 16 respectively), the circuitry 20 may also be used to implement the software platform 14. That is, the circuitry 20 may be used to perform the method described herein and to host the software platform 14.

The circuitry 20 (and processor 64) may have various implementations. For example, the circuitry 20 may include any suitable device, such as a processor (e.g., CPU), programmable circuit, integrated circuit, memory and I/O circuits, an application specific integrated circuit, microcontroller, complex programmable logic device, other programmable circuits, or the like. The circuitry 20 may also include a non-transitory computer readable medium, such as random access memory (RAM), a read-only memory (ROM), an erasable programmable read-only memory (EPROM or Flash memory), or any other suitable medium. Instructions for performing the method described below may be stored in the non-transitory computer readable medium and executed by the circuitry 20. The circuitry 20 may be communicatively coupled to the computer readable medium and network interface through a system bus, mother board, or using any other suitable structure known in the art.

The computer readable medium (memory) 54 (and non-transitory computer readable medium 66 may be, for example, one or more of a buffer, a flash memory, a hard drive, a removable media, a volatile memory, a non-volatile memory, a random access memory (RAM), or other suitable device. In a typical arrangement, the computer readable medium 54 may include a non-volatile memory for long term data storage and a volatile memory that functions as system memory for the processor 54. The computer readable medium 54 may exchange data with the circuitry over a data bus. Accompanying control lines and an address bus between the computer readable medium 54 and the circuitry also may be present. The computer readable medium 54 is considered a non-transitory computer readable medium.

The communication interface 22 (and network interface 68) may comprise a wireless network adaptor, an Ethernet network card, or any suitable device that provides an interface to a network. The communication interface 22 may be communicatively coupled to the computer readable medium, such that the communication interface 22 is able to send data stored on the computer readable medium across the network and store received data on the computer readable medium 22. The communication interface 56 may also be communicatively coupled to the circuitry such that the circuitry is able to control operation of the communication interface 22. The communication interface 22, computer readable medium, and circuitry may be communicatively coupled through a system bus, mother board, or using any other suitable manner as will be understood by one of ordinary skill in the art.

Alternatively, the communication interface 22 may be a system bus when the electronic device 12 performs the methods described herein and also executes the software platform 14.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A method executed by circuitry for monitoring a software platform including multiple pods that manage, deploy, and execute micro services, the method comprising:
   identifying using the circuitry at least one pod of interest of the software platform;
   creating at least one monitoring pod, wherein:
   the created at least one monitoring pod is in addition to the multiple pods of the software platform;
   designating at least one of the at least one monitoring pod as a sending pod configured to communicate with a security program executed by a processor;
   for each of the at least one pod of interest, positioning one of the at least one monitoring pod in association with the pod of interest using the circuitry, such that:
   transactions received by the pod of interest are first received by the monitoring pod; and/or
   transactions sent by the pod of interest to a peer pod are first received by the monitoring pod before reaching the peer pod;
   for each transaction received by a monitoring pod:
   confirming that the received transaction includes a unique identifier by:
   determining if the received transaction includes a unique identifier; and
   adding a unique identifier to identifying information attached to the received transaction not including a unique identifier; and
   adding a defined characteristic for the monitoring pod to the identifying information of the transaction; and
   for each transaction received by a sending pod, sending the identifying information of the transaction to the security program;
   performing a security review of the identifying information received by the security program comprising:
   identifying any matched rules from a set of predefined rules that are satisfied by the defined characteristics included in the received identifying information; and
   generating and outputting a security report based on the identified matched rules; and
   identifying an unsecure monitoring pod based on the security report and either:
   passing instructions to the unsecure monitoring pod to secure the software platform, wherein the unsecure monitoring pod no longer passes along transactions received by the unsecure monitoring pod; or
   injecting an attack configured to be detected by a security mechanism of the software platform, wherein the security mechanism limits the transactions received by the pod associated with the unsecure monitoring pod.

2. The method of claim 1, wherein:
   the predefined rules include at least one sequential rule;
   the at least one sequential rule includes an ordered sequence of defined characteristics; and
   the received identifying information matches the at least one sequential rule when the received identifying information includes the defined characteristics of the at least one sequential rule in a same order as the at least one sequential rule.

3. The method of claim 1, wherein the generating of the report includes adding to the report remedial security measures associated with the matched rules.

4. The method of claim 1, wherein the at least one sending pod is identified based on properties of the identifying information of the transaction.

5. The method of claim 4, wherein a receiving pod that receives the transaction self identifies as one of the at least one sending pods when at least one of:
a size of the identifying information of the received transaction surpasses a size threshold; or
the identifying information of the received transaction includes a predetermined defined characteristic.

6. The method of claim 1, wherein the at least one sending pod is identified based on a position of the at least one sending pod within the software platform.

7. The method of claim 6, wherein a receiving pod that receives the transaction self identifies as one of the at least one sending pods when the received transaction will not be sent to any additional pods in the software platform after the received transaction is processed by the receiving pod.

8. The method of claim 1, wherein the transaction is a network packet and the identifying information is stored in a header of the network packet.

9. The method of claim 1, wherein the identifying information is predefined codes associated with characteristics of the transaction.

10. The method of claim 9, wherein the characteristics include at least one of: source address and port, destination address and port, source protocol, destination protocol, source micro service application, destination micro service application, source micro service type, destination micro service type, source data classification, destination data classification, order and time interval of flow in various sidecars in the software platform, or credentials used to process and execute the transaction by the micro service.

11. An electronic device for monitoring a software platform including multiple pods that manage, deploy, and execute micro services, the electronic device comprising:
a non-transitory computer readable memory storing a set of predefined rules circuitry configured to:
identify at least one pod of interest of the software platform;
create at least one monitoring pod, wherein:
the created at least one monitoring pod is in addition to the multiple pods of the software platform;
designate at least one of the at least one monitoring pod as a sending pod configured to communicate with a security program executed by a processor;
for each of the at least one pod of interest, position one of the at least one monitoring pod in association with the pod of interest using the circuitry, such that:
transactions received by the pod of interest are first received by the monitoring pod and/or transactions sent by the pod of interest to a peer pod are first received by the monitoring pod before reaching the peer pod;
for each transaction received by a monitoring pod:
confirming that the received transaction includes a unique identifier by:
determining with the monitoring pod if the received transaction includes a unique identifier; and
adding a unique identifier with the monitoring pod to identifying information attached to the received transaction not including a unique identifier; and
adding with the monitoring pod a defined characteristic for the monitoring pod to the identifying information of the transaction; and
for each transaction received by a sending pod, sending with the monitoring pod the identifying information of the transaction to a security program;
execute the security program;
perform a security review of the identifying information received by the security program, the security review including identifying any matched rules from the set of predefined rules that are satisfied by the defined characteristics included in the received identifying information;
generate and output a security report based on the identified matched rules; and
identify an unsecure monitoring pod based on the security report and either:
pass instructions to the unsecure monitoring pod to secure the software platform, wherein the unsecure monitoring pod no longer passes along transactions received by the unsecure monitoring pod; or
inject an attack configured to be detected by a security mechanism of the software platform, wherein the security mechanism limits the transactions received by the pod associated with the unsecure monitoring pod.

12. The electronic device of claim 11, wherein:
the predefined rules include at least one sequential rule;
the at least one sequential rule includes an ordered sequence of defined characteristics; and
the received identifying information matches the at least one sequential rule when the received identifying information includes the defined characteristics of the at least one sequential rule in a same order as the at least one sequential rule.

13. The electronic device of claim 11, wherein the generating of the report includes adding to the report remedial security measures associated with the matched rules.

14. The electronic device of claim 11, wherein the circuitry is further configured to identify the at least one sending pod based on a position of the at least one sending pod within the software platform.

15. The electronic device of claim 11, wherein the identifying information is predefined codes associated with characteristics of the transaction.

16. The electronic device of claim 15, wherein the characteristics include at least one of: source address and port, destination address and port, source protocol, destination protocol, source micro service application, destination micro service application, source micro service type, destination micro service type, source data classification, destination data classification, order and time interval of flow in various sidecars in the software platform, or credentials used to process and execute the transaction by the micro service.

* * * * *